Jan. 21, 1969  TADAMICHI MORI ET AL  3,422,738
AUTOMATIC EXPOSURE FLASH CAMERA
Filed July 13, 1965

INVENTORS
TADAMICHI MORI
KOJI TANABE
BY Stanley Wolder
ATTORNEY

United States Patent Office 3,422,738
Patented Jan. 21, 1969

3,422,738
AUTOMATIC EXPOSURE FLASH CAMERA
Tadamichi Mori, Tokyo-to, and Koji Tanabe, Higashi-murayama-shi, Tokyo-to, Japan, assignors to Citizen Tokei Kabushiki Kaisha, Shinjuku-ku, Japan, a corporation of Japan
Filed July 13, 1965, Ser. No. 471,657
Claims priority, application Japan, July 24, 1964, 39/41,817
U.S. Cl. 95—10   6 Claims
Int. Cl. G01j 1/00; 1/52

ABSTRACT OF THE DISCLOSURE

A camera shutter automatic timing mechanism for use with photoflash devices includes an electronic switch responsive to a predetermined signal voltage and functioning to close the camera shutter following the opening thereof. A timing network includes a series connected photoconductor and timing capacitor and a resistor connected through a switch across the photoconductor. The RC value of the resistor and capacitor is such that the capacitor reaches the switch triggering voltage following the opening of the shutter a time about equal the illumination time of the photoflash device. The exposure is compensated for the ambient light conditions by the present system.

---

The present invention relates generally to improvements in cameras and it relates more particularly to an improved automatic exposure camera for use with photoflash illumination.

It is a common practice to employ a photoconductor such as a cadmium sulfide cell in automatically controlling one or more exposure parameters, for example, the shutter speed or the diaphragm opening or both of a camera in accordance with the intensity of the light incident in the photoconductor. However, particularly in the low illumination range, the response of such photoconductor is inadequate where the object being photographed is photoflash illuminated since the response time of the photoconductor is excessive. Accordingly, a smaller exposure error is experienced by effecting the flash immediately following the opening of the shutter and keeping the shutter open for approximately the duration of the flash so as to expose the film to the object image for the full flash illuminated period. The flash duration and intensity is generally constant for the particular type of flash bulbs or flash units and in the case of flash bulbs is between about 30 and 50 milliseconds depending on the type of flash bulb. The diaphragm opening is generally simply determined in the known manner from the speed of the film, the distance of the object and the flash bulb guide number, the latter being a measure of the flash bulb light output. While the aforesaid procedure is satisfactory where the ambient light conditions are very low, in the presence of appreciable ambient light conditions, overexposure of the film results which overexposure increases with increased ambient light conditions.

It is thus a principal object of the present invention to provide an improved camera.

Another object of the present invention is to provide an improved automatic exposure camera.

Still another object of the present invention is to provide an automatic exposure camera for use with photoflash illumination which provides exposure compensation for ambient light conditions.

A further object of the present invention is to provide an automatic exposure camera of the above nature characterized by its reliability, accuracy and adaptability.

Figure 1:
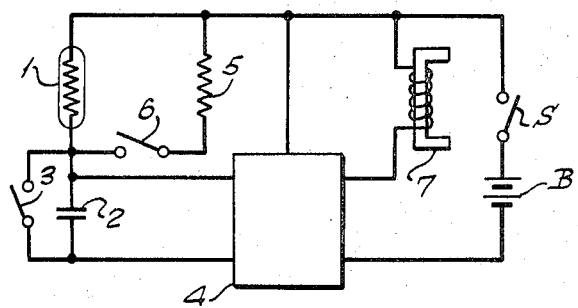
Figure 2:
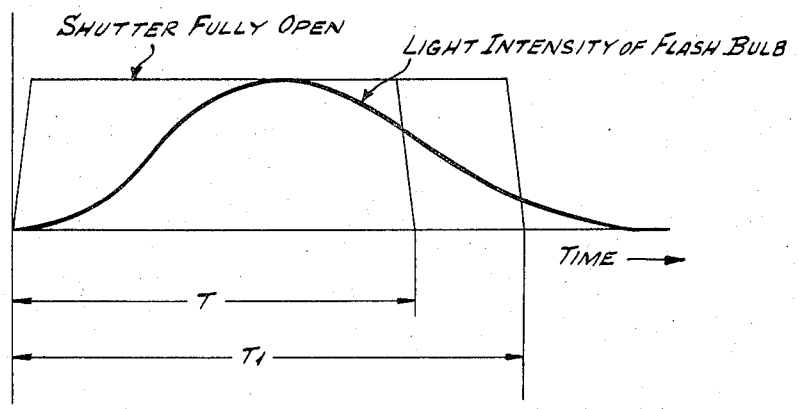

The above and other objects of the present invention will become apparent from a reading of the following description taken in conjunction with the accompanying drawing, wherein:

FIGURE 1 is a circuit diagram of an automatic exposure camera embodying the present invention; and FIGURE 2 is a graph illustrating the operation of the improved camera.

In a sense, the present invention contemplates the provision in an automatic exposure camera for use with a photoflash device having a predetermined illumination interval, a photoconductor, means for controlling an exposure parameter of said camera in response to the resistance of said photoconductor, a resistor, means including a switch for connecting said resistor across said photoconductor, said resistor having a resistance regulating said exposure control means in accord with the illumination of said photoflash device.

According to a preferred form of the present camera, there is provided a known automatic shutter control which comprises an RC timing network including a series connected timing capacitor and photoconductor which are connected through a switch across a battery, the capacitor being connected to the input of an electronic switch, the output of which controls the closing of the camera shutter. The resistor is connected through a switch across the photoconductor and is of a resistance to effect the charging of the capacitor to a voltage to actuate the switch at a time following the initiation of the charging with the opening of the shutter corresponding to the illumination period of the associated flash device, preferably between about 30 and 50 milliseconds in the case of flash bulbs.

Referring to the drawing which illustrates a preferred embodiment of the present invention, the reference numeral 1 generally designates a photoconductor, particularly a cadmium sulfide cell, which is directed with the camera toward the object being photographed. The photoconductor 1 is connected in series with a capacitor 2 to define an RC timing network which is through a normally open switch S and an electronic switch 4 across a battery B. The capacitor 2 is shunted by a normally closed switch 3 and is connected to the control terminals of the electronic switch 4. An electromagnet 7 is connected through the output of the electronic switch 4 and switch S across the battery B and cooperates with the camera shutter to release the open shutter to a closed condition upon the opening of the switch 4 which effects the de-energization of the electromagnet 7. The aforesaid system and its operation is broadly known. Upon the opening of the camera shutter, the switch 3 is opened, and the switch S is closed to initiate the charging of the capacitor 2 through the photoconductor 1 and energize the electromagnet 7 to retain the shutter in its open position. The capacitor 2 is charged at a rate determined by the resistance of the photoconductor 1 which depends upon the intensity of the light incident thereon. Upon the capacitor 2 reaching a predetermined voltage the electronic switch 4 is actuated to open condition to de-energize the electromagnet 7 and close the shutter thereby automatically controlling the shutter speed in accordance with the ambient light.

In accordance with the present invention a resistor 5 is connected through a switch 6 across the photoconductor 1. When the camera is employed with a photoflash device, the switch 6 is closed to shunt the photoconductor with the resistor 5. When a photoflash is not employed the switch 6 is opened.

As shown in FIGURE 2, the value of the resistor 5 is so selected that in the complete absence of ambient light, namely in darkness where the resistance value of the photoconductor 1 may be considered almost infinitely large in comparison with that of the resistor 5, an exposure time $T_1$ is obtained that the camera shutter remains open during substantially the full illumination period or radiant duration of the associated flash bulb.

As is noted in FIGURE 2, the true time characteristic curve of the light intensity of the flash bulb is not rectangular, however, for present purposes, this curve will be considered as rectangular. If in complete absence of ambient light the time $T_1$ required for obtaining a proper exposure by means of flash bulb only, and alternatively, if the proper exposure time $T_2$ is that required with the ambient light only, then, considering that exposure time is inversely proportional to brightness and that light is of a superposition nature, the exposure time T needed in the presence of both the flash bulb light and the ambient light is obtained as follows:

Let the object brightness due to ambient light be $L_2$, the object brightness due to the flash bulb alone be $L_1$, and the proportionality constant be $k$, then:

$$T_1 = k/L_1 \qquad T_2 = k/L_2$$

therefore $$T = k/(L_1+L_2) = T_1 T_2/(T_1+T_2)$$

Now, upon utilizing flash bulb the switch 6 is kept closed so that the resistor 5 is connected in parallel with the photoconductor 1. Let the resistance value of the photoconductor 1 with the ambient light intensity be $R_2$ and the resistance of the resistor 5 be $R_1$, then, considering that exposure time is directly proportional to resistance value, $$T_1 = k'R_1 \qquad T_2 = k'R_2$$

therefore $$T = k' \frac{R_1 R_2}{R_1+R_2} = k' \frac{T_1/k' \times T_2/k'}{T_1/k' + T_2/k'}$$

$$= T_1 T_2/(T_1+T_2)$$

Thus, almost complete compensation is effected with a range of error due to the assumption that the flash bulb light intensity characteristic curve be rectangular.

Actually, as seen in FIGURE 2, the light intensity characteristic curve is not rectangular and in comparison with proper exposure time a certain degree of error is produced. This error becomes positive when the proper exposure time becomes greater than approximately $T_2/2$. Thus the compensation amount tends to be small. In this case the photoconductor 1 makes response to a certain extent, varying the resistance value to some extent. Thus the exposure time is further slightly shortened, resulting in further diminished error.

In case of such considerable brightness that the exposure time becomes shorter than approximately $T_2/2$, the error becomes negative. This causes a situation which is opposite to that mentioned above and no effect is produced to further diminish the error. It would be comparatively rare, however, that flash bulbs are utilized under such bright condition. The only effect is that the error somewhat increases accordingly. However, the system according to the present invention results in a greater advantageous effect than the conventional mechanical shutter which cannot automatically compensate the effect of the ambient light so that in case of a certain degree of ambient light brightness considerable exposure error results.

It is of course necessary with the system according to the present invention that the diaphragm aperture be preset in accordance with the guide number depending on the kind of the flash bulb and the distance between the camera and the object to be photographed.

According to the system of the present invention, an advantage is obtained in that the effect of ambient light can be compensated by means of very simple structure, since at the present stage of art, in view of the stability and cost, only such photoconductive elements of unfavourable light-response characteristics as cadmium sulfide, etc. can be utilized for automatic exposure control shutter provided with a time constant circuit comprising a photoconductor and a capacitor.

While there has been described and illustrated a preferred embodiment of the present invention, it is apparent that numerous alterations, omissions and additions may be made without departure from the spirit thereof.

What is claimed is:

1. In an automatic exposure camera for use under ambient light conditions with a photoflash device having a predetermined illumination interval, a photoconductor, means for controlling an exposure parameter of said camera in response to the resistance of said photoconductor, resistor means including a resistor and a switch for connecting said resistor across said photoconductor, said resistor means and said photoconductor having a resistance regulating said exposure control means in accordance with the illumination of said photoflash device and the ambient light.

2. In an automatic exposure camera including a shutter and means for effecting the closing of said shutter following the opening thereof, a timing network including a timing capacitor, means for charging said timing capacitor, means including a photoconductor for varying the charge on said capacitor at a rate dependent upon the light incident on said photoconductor, resistor means including a resistor and a switch for connecting said resistor across said photoconductor and in series with said capacitor, and means responsive to the charge on said capacitor through said resistor means and photoconductor for controlling said shutter closing means in accordance with the illumination of said photoflash device and the ambient light.

3. An automatic exposure camera for use with a photoflash device having a predetermined illumination period and having a shutter, comprising a timing network including a photoconductor and charging capacitor connected in series, means operable with the opening of said shutter for connecting said timing network to a source of voltage, means responsive to a predetermined charge on said capacitor for effecting the closing of said shutter, and resistor means including a resistor and means for connecting said resistor across said photoconductor and in series with said voltage source, said resistor means having a resistance value to effect the charging of said capacitor independently of said photoconductor to said predetermined charge in an interval approximately equal to said illumination period.

4. The automatic exposure camera of claim 3 wherein the resistance of said resistor means is less than the dark resistance of said photoconductor.

5. The automatic exposure camera of claim 3 wherein the means connecting said resistor across said photoconductor comprises a switch.

6. The automatic exposure camera of claim 3 including a normally closed switch connected across said capacitor and urged to an open position with the opening of said shutter.

References Cited

UNITED STATES PATENTS

| 3,200,723 | 8/1965 | Topaz | 95—31 |
| 3,205,803 | 9/1965 | Burgarella et al. | 95—31 |
| 1,934,484 | 11/1963 | Camilli | 95—10 |
| 1,974,433 | 8/1937 | Riszdorfer | 95—10 |
| 3,063,354 | 11/1962 | Matulik et al. | 95—10 |
| 3,324,779 | 6/1967 | Nobusawa et al. | 95—10 |
| 3,326,103 | 6/1967 | Topaz | 95—10 |

NORTON ANSHER, *Primary Examiner.*

R. A. SCHROEDER, *Assistant Examiner.*